United States Patent [19]

Davies et al.

[11] Patent Number: 5,886,093
[45] Date of Patent: Mar. 23, 1999

[54] BIODEGRADABLE POLYESTER WITH IMPROVED MOLDING CHARACTERISTICS AND ITS PRODUCTION

[75] Inventors: Martin Thomas Davies, Surrey, United Kingdom; Naseer Mohammed Qureshi, Weston, Canada; Barry Woodfine; Barry Keane, both of Surrey, United Kingdom

[73] Assignee: Kabushiki Kaisha Kobe Seiko Sho, Kobe, Japan

[21] Appl. No.: 84,929

[22] Filed: May 28, 1998

[30] Foreign Application Priority Data

Jun. 3, 1997 [GB] United Kingdom .............. 9711456
Dec. 3, 1997 [GB] United Kingdom .............. 9725558

[51] Int. Cl.$^6$ .............................. C08K 5/06; C08G 63/08
[52] U.S. Cl. .................... 524/755; 528/354; 528/355; 528/357; 528/359; 528/361; 524/765; 524/783; 524/784
[58] Field of Search .................................. 528/354, 355, 528/357, 359, 361; 524/755, 765, 783, 784

[56] References Cited

U.S. PATENT DOCUMENTS

| | | | |
|---|---|---|---|
| 5,225,129 | 7/1993 | van den Berg | 264/85 |
| 5,232,648 | 8/1993 | Kennedy et al. | 264/210.8 |
| 5,412,067 | 5/1995 | Shinoda et al. | 528/361 |
| 5,425,984 | 6/1995 | Kennedy et al. | 428/229 |
| 5,484,882 | 1/1996 | Takada et al. | 528/361 |
| 5,492,997 | 2/1996 | Grijpma et al. | 528/198 |
| 5,540,929 | 7/1996 | Narayan et al. | 424/422 |
| 5,593,778 | 1/1997 | Kondo et al. | 428/373 |
| 5,672,367 | 9/1997 | Grijpma et al. | 426/6 |
| 5,679,723 | 10/1997 | Cooper et al. | 523/115 |
| 5,747,637 | 5/1998 | Shinoda et al. | 528/354 |
| 5,801,224 | 9/1998 | Narayan et al. | 528/357 |

*Primary Examiner*—Samuel A. Acquah
*Attorney, Agent, or Firm*—Hazel & Thomas, P.C.

[57] ABSTRACT

The invention relates to a method for preparing a biodegradable aliphatic polyester, which comprises polymerization of a precursor of the polyester in the presence of a polyesterification catalyst in an amount of up to 0.1% by weight, based on the weight of the cyclic precursor, and a co-catalyst comprising glycerol or butyrolactone in a weight proportion of not more than three times that of the catalyst.

The invention also relates to the use of the resulting biodegradable aliphatic polyester in polymer processing, such as injection molding or compression/press molding.

17 Claims, No Drawings

BIODEGRADABLE POLYESTER WITH IMPROVED MOLDING CHARACTERISTICS AND ITS PRODUCTION

This invention relates to improved catalysts for the production of biodegradable polyesters such as poly(lactic acid), referred to as PLA. We have found that the use of certain co-catalysts with the standard catalysts such as tin octoate leads to improvements in properties such as molecular weight (mw), melt transition temperature (Tm) and crystallinity of the polyester product and the rate of production of product.

The invention also relates to a biodegradable polyester with improved molding characteristics.

Useful biodegradable polyesters can be prepared by ring-opening polymerization of cyclic precursors such as cyclic lactones, in particular lactide, glycolide, trimethylene carbonate or caprolactone. In the following, reference will be made to lactide and its polymerization product, polylactic acid, but it should be noted that the discussion will equally apply to other cyclic lactones and polyesters produced therefrom.

Poly(lactic acid) or polylactide polymers, known hereafter as PLA, are of commercial interest as an environmentally friendly biodegradable option to non-degradable polymers such as polypropylene, polystyrene or polyethylene terephthalate. PLA can be processed by standard methods such as extrusion or injection molding or fibre spinning. One of the major drawbacks of PLA is that the temperatures required for processing are close to the decomposition temperatures of the polymer chain. The addition of process stabilizers, such as anti-oxidants, is one of the most usual methods for overcoming this deficiency. Also commercial PLA is slow to crystallize from the melt, resulting in longer cycle times and a less cost-effective molding operation. Process stabilizers typically have a detrimental effect on the temperature of crystallization which can exacerbate this molding problem. A PLA material which can overcome either of these problems will be advantageous. Surprisingly, we have found that PLA produced according to the present invention can overcome both these problems and is useful as a molding material.

PLA has a number of excellent properties but the production process for PLA is a relatively slow polymerization reaction. The prolonged high temperature (>160° C.) exposure required to generate PLA with high conversion from lactide leads to discoloration and degradation of the PLA. We have been working to develop an improved catalyst to overcome this drawback.

A wide range of catalysts are known to polymerize lactide monomer and other cyclic precursors to polyesters, including compounds of tin, zinc, aluminum, magnesium, antimony and a range of other metals. Certain non-metallic catalysts are also known. However, tin octoate has been selected as the catalyst of choice by many skilled in the art because of three main advantages—it is a comparatively good catalyst, it is a liquid which eases mixing problems, and it has FDA approval for food contact applications. This last point is especially important when the PLA is targeted at food packaging applications.

We have found that addition of glycerol or butyrolactone as a co-catalyst can significantly enhance the catalytic activity of tin octoate and other ring-opening polyesterification catalysts without compromising other polymer properties such as mw and Tm for example. Glycerol has been used as comonomer in lactide polymerizations using tin octoate as the catalyst (*Polymer* 36(1995), 2947–2956). The PLA produced showed lowered Tg (glass transition temperature) and Tm values, lowered mw and lowered levels of crystallinity. This was evident even at the lowest glycerol concentration of 1% used in that work. The yield of any glycerol modified PLA did not exceed that quoted for the glycerol-free PLA produced under the same experimental conditions indicating no improvement in reaction rate in the presence of glycerol at levels of 1% or more. It is surprising therefore that we found glycerol to be an effective co-catalyst for tin octoate in terms of increased reaction rates/conversions, increased mw and maintained Tm value when used at similar levels to that of the tin octoate catalyst. The optimum level was found to be 20–100 ppm glycerol by weight when using tin octoate at the 50 ppm level.

Butyrolactone has not been used in lactide polymerizations with tin octoate as far as we are aware. It has been used as a comonomer in the polymerization of the analogous glycolide (*Die Makromolekulare Chemie* 100(1967), 262–266). The catalyst used in that case was antimony trifluoride. The authors of that paper commented that the yield of polymer was decreased remarkably in the presence of butyrolactone. Butyrolactone had an adverse effect on the catalyst and the polyglycolide mw was substantially decreased, as monitored by the large reduction in η (melt viscosity). This suggests that butyrolactone would be expected to interfere with the catalyst in lactide polymerizations also. We have found that this is not the case and that it is an effective co-catalyst at around 50 ppm by weight when using 50 ppm tin octoate for the polymerization of lactide. Significant increases in the polymerization rate and PLA mw are evident.

The present invention provides a method for preparing a biodegradable aliphatic polyester, which comprises polymerization of a precursor of the polyester in the presence of a polyesterification catalyst in an amount of up to 0.1% by weight, based on the weight of the precursor, and a co-catalyst comprising glycerol or butyrolactone in a weight proportion of not more than three times that of the catalyst.

The invention also provides a catalyst composition for polymerization of a precursor of a biodegradable aliphatic polyester, comprising a polyesterification catalyst and a co-catalyst comprising glycerol or butyrolactone in a weight proportion of not more than three times that of the catalyst.

The invention further relates to use of glycerol or butyrolactone as a co-catalyst in the polymerization of a precursor of a biodegradable aliphatic polyester catalyzed by a polyesterification catalyst.

The invention additionally relates to the use of a biodegradable aliphatic polyester, prepared by the aforesaid method, in polymer processing operations, in particular injection molding or compression/press molding, and products made from the biodegradable aliphatic polyester.

The method of the invention preferably comprises ring-opening polymerization of a cyclic precursor of the polyester in the presence of a ring-opening polymerization catalyst.

The cyclic precursor is preferably a cyclic lactone. Particularly preferred cyclic precursors are lactide, glycolide, trimethylene carbonate or caprolactone, or any mixture thereof.

The catalyst is preferably a metal carboxylate, an organometal carboxylate, a metal oxide or a metal halide. The metal is preferably tin or zinc. Particularly preferred catalysts are tin (II) octoate, triphenyl tin acetate and tin oxide.

The catalyst is preferably present in an amount of from 0.0001% to 0.1% by weight, in particular from 0.0005% to 0.01% by weight, based on the weight of the cyclic precursor. The co-catalyst is preferably present in an amount of from 25% to 300% by weight, in particular from 75% to 200% by weight based on the weight of the catalyst.

The biodegradable aliphatic polyester prepared by the method according to the invention may be used for manufacture of biodegradable products. Such products include disposable or single use food containers and utensils, agrarian or horticultural products, and controlled release chemical containers.

We have thus developed a lactide (monomer) ring-opening catalyst with improved activity. The catalyst also shows improved activity in related ring opening polymerizations involving monomers such as glycolide, caprolactone, trimethylene carbonate and the like.

The invention is characterized in the use of either glycerol or butyrolactone as co-catalysts with ring-opening polyesterification catalyst such as tin octoate. These co-catalysts work with other tin based catalysts, such as triphenyltin acetate, tin oxide, etc. The level of addition of co-catalyst is similar to that of the catalyst, including at the very low level of tin used in the Examples (50 ppm by weight).

The catalyst combinations can tolerate process additives, including materials such as stabilizers or nucleating agents, without significant adverse effects on catalytic activity or polymer properties.

The principal advantage of the invention is in increased catalyst activity leading to improved precursor to product conversion during the earlier stages of the reaction. This results in lowered reaction times for a similar level of monomer conversion when using the co-catalysts compared to the tin octoate catalyst alone. This lowered reaction time at the reaction temperature will also serve to substantially reduce any adverse effects of temperature on the polyester product such as PLA as it is produced. In particular, adverse effects such as discoloration and polyester degradation resulting in eg mw and/or Tm reduction can be significantly reduced.

The co-catalysts, being organic in nature, do not contribute any further heavy metals to the polyester product and would not influence any pre-existing regulatory acceptance of polyester such as PLA on that basis. Glycerol in particular is a very benign material to use as a co-catalyst as it is accepted for use in a wide range of end-use applications and it and any esterified derivatives are biodegradable. In PLA, where food contact and biodegradability are of particular interest, this is advantageous.

The aliphatic polyester is preferably polylactic acid or polyglycolic acid, and most preferably polylactic acid. The polymer is made with the combination of catalysts described above, and is especially PLA made with the combination of tin octoate and glycerol in a weight ratio of tin octoate in a weight ratio of tin octoate:glycerol of from 0:3:1 to 2:1.

The PLA polymer produced using tin octoate/glycerol catalysts has a lower melt viscosity than those produced by the standard tin octoate catalyst. This is useful in injection molding for example, because to fill molds with thin sections requires a low melt viscosity. Increasing the temperature is a common route to lowering polymer viscosity in order to reach the low required melt viscosity, but for PLA, the low decomposition temperature prevents this from being carried out effectively in most cases. In practice, this factor limits the thinness of the moldings that can be made using standard PLA. However, the PLA of the present invention displays lower viscosities at usual molding temperatures and therefore fills thinner sections more readily. This leads to significant advantages in molding flexibility and costs. Also, the faster crystallization leads to quicker part consolidation (faster development of properties) and faster cycle times in molding. The mold may also be held at higher temperatures than for standard PLA. These factors lead to economic advantages over standard PLA moldings. It is recognized that the crystallinity levels in PLA polymer made using the different catalysts may not be the same.

The following Examples illustrate the invention.

EXAMPLES

The following general experimental procedure was used in each of the Examples.

Dry lactide was added to a glass ampoule. The appropriate quantity of catalyst and co-catalyst was added as a 10% solution. The solvent was removed under vacuum at room temperature. The ampoule was sealed under a nitrogen atmosphere and placed in a pre-heated oven at 180° C. The timing was started.

After a set time, the ampoule was removed from the oven and cooled. The total contents of the ampoule were dissolved in chloroform and analyzed by GPC (gel permeation chromatography). The results are given in the Tables below.

Comparative Examples 1–6.

| Catalyst, amount | % conversion of lactide and PLA Mw. | |
|---|---|---|
|  | 2.5 hrs reaction | 5 hrs reaction |
| Tin octoate, 50 ppm | 11% | 47% |
|  | Mw = 58,500 | Mw = 105,400 |
| Dibutyltin bis(octoate), 50 ppm | 6% | 17% |
|  | Mw = 35,000 | Mw = 65,600 |
| Triphenyltin acetate, 50 ppm | 29% | 81% |
|  | Mw = 165,000 | Mw = 397,200 |
| Tin (IV) bromide, 50 ppm | 8% |  |
|  | Mw = 47,400 |  |
| Zinc octoate, 50 ppm | 6% | 18% |
|  | Mw = 24,100 | Mw = 59,400 |
| Zinc acetate, 50 ppm |  | 3% |
|  |  | Mw = 15,200 |

Examples 7–16.

In each of these Examples, the catalyst used was tin octoate at 50 ppm. The influence of co-catalyst type and concentration is examined.

| Catalyst, amount | % conversion of lactide and PLA Mw. | |
|---|---|---|
|  | 1 hr reaction | 2.5 hrs reaction |
| Glycerol, 10 ppm | — | 9% |
|  |  | Mw = 29,300 |
| Glycerol, 25 ppm | — | 39% |
|  |  | Mw = 279,200 |
| Glycerol, 50 ppm | — | 71% |
|  |  | Mw = 397,300 |
| Glycerol, 75 ppm | 57% | 92% |
|  | Mw = 369,700 | Mw = 342,200 |
| Polyethylene glycol, 50 ppm | — | 57% |
|  |  | Mw = 295,000 |
| Benzyl alcohol, 25 ppm | — | 33% |
|  |  | Mw = 162,800 |
| Benzyl alcohol, 50 ppm | — | 43% |
|  |  | Mw = 311,300 |
| Benzyl alcohol, 75 ppm | — | 16% |
|  |  | Mw = 104,200 |
| m-cresol, 50 ppm | — | 36% |
|  |  | Mw = 269,200 |
| Butyrolactone, 50 ppm | — | 92% |
|  |  | Mw = 351,300 |

Examples 17–18.

In these Examples, the catalyst system was 50 ppm tin octoate +75 ppm glycerol and the reaction was conducted at 180° C. for 2.5 hours. The influence of process additives such as a typical filler/nucleating agent and phosphite stabilizer are examined.

| Additive used | % conversion of lactide and PLA Mw |
|---|---|
| Talc | 91% |
| | Mw = 390,100 |
| Phosphite | — |
| | Mw - 497,000 |

Example 19.

Two samples of PLA have been characterized by parallel plate rheology. The PLA samples were produced using standard tin octoate catalyst (PLA sample 1) or tin octoate/glycerol catalyst combination (PLA sample 2). The two samples are almost identical in composition—PLA sample 1 showed 95% conversion to polymer and mw=185,300 whilst PLA sample 2 showed 96% conversion to polymer and mw=216,100. The data presented in the Table illustrates the lower melt viscosity of PLA sample 2 at the preferred PLA molding temperatures around 180° C. and the higher crystallization/solidification temperatures.

TABLE

| | PLA sample 1 | PLA sample 2 |
|---|---|---|
| Melt viscosity at temperature (Pa.s) | | |
| −180° C. | 490 | 100 |
| −135° C. | 1,070 | 650 |
| −90° C. | 1,1,000,000 | 900,000 |
| −45° C. | 4,000,000 | 3,000,000 |
| Crystallization temperature (°C.) | 60 | 93 |

We claim:

1. A method for preparing a biodegradable aliphatic polyester, which comprises polymerization of a precursor of the polyester in the presence of a polyesterification catalyst in an amount of from 0.0001% to 0.1% by weight, based on the weight of the precursor, and a co-catalyst comprising glycerol or butyrolactone in a weight proportion of not more than three times that of the catalyst.

2. A method according to claim 1, which comprises ring-opening polymerization of a cyclic precursor of the polyester in the presence of a ring-opening polyesterification catalyst.

3. A method according to claim 1, in which the precursor is a cyclic lactone.

4. A method according to claim 1, in which the precursor is lactide, glycolide, trimethylene carbonate or caprolactone, or any mixture thereof.

5. A method according to claim 1, in which the catalyst is a metal carboxylate, an organometal carboxylate, a metal oxide or a metal halide.

6. A method according to claim 5, in which the metal is tin or zinc.

7. A method according to claim 6, in which the catalyst is tin (II) octoate, triphenyltin acetate or tin oxide.

8. A method according to claim 7, in which the catalyst is present in an amount of from 0.0005% to 0.01% by weight, based on the weight of the cyclic precursor.

9. A method according to claim 1, in which the co-catalyst is present in an amount of from 25% to 300% by weight, based on the weight of the catalyst.

10. A method according to claim 9, in which the co-catalyst is present in an amount of from 75% to 200% by weight, based on the weight of the catalyst.

11. A catalyst composition for polymerization of a precursor of a biodegradable aliphatic polyester, comprising of a polyesterification catalyst and a co-catalyst comprising glycerol or butyrolactone in a weight proportion of not more than three times that of the catalyst.

12. A biodegradable product comprising a biodegradable aliphatic polyester prepared by a method according to claim 1.

13. In a method of polymerizing a precursor of a biodegradable aliphatic polyester catalyzed by a polyesterification catalyst, wherein the improvement comprises using glycerol or butyrolactone as a co-catalyst.

14. In a method of processing a polymer, wherein the improvement comprises using a biodegradable aliphatic polyester produced by a method which comprises polymerization of a precursor of the polyester in the presence of a polyesterification catalyst in an amount of from 0.0001% to 0.1% by weight, based on the weight of the precursor, and a co-catalyst comprising glycerol or butyrolactone in a weight proportion of not more than three times that of the catalyst.

15. A processing method according to claim 14 which is injection molding or compression/press molding.

16. A method according to claim 14 wherein the biodegradable aliphatic polyester is polylactic acid or polyglycolic acid.

17. A method according to claim 14 wherein the biodegradable aliphatic polyester is polylactic acid, and the catalyst/co-catalyst is tin octoate:glycerol in a weight ratio of from 0.3:1 to 2:1 biodegradable polymer is prepared by injection molding.

* * * * *